(12) United States Patent
Kawai et al.

(10) Patent No.: US 11,373,669 B2
(45) Date of Patent: Jun. 28, 2022

(54) ACOUSTIC PROCESSING METHOD AND ACOUSTIC DEVICE

(71) Applicant: YAMAHA CORPORATION, Hamamatsu (JP)

(72) Inventors: Tetsuto Kawai, Aichi (JP); Yusuke Kadowaki, Hamamatsu (JP); Yoshifumi Oizumi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 94 days.

(21) Appl. No.: 16/890,010

(22) Filed: Jun. 2, 2020

(65) Prior Publication Data

US 2020/0388299 A1  Dec. 10, 2020

(30) Foreign Application Priority Data

Jun. 7, 2019  (JP) .............................. JP2019-106860

(51) Int. Cl.
*H04M 9/00* (2006.01)
*H04M 1/60* (2006.01)
*G10L 21/0272* (2013.01)
*G10L 21/0316* (2013.01)
*G10L 25/84* (2013.01)

(52) U.S. Cl.
CPC ...... *G10L 21/0272* (2013.01); *G10L 21/0316* (2013.01); *G10L 25/84* (2013.01)

(58) Field of Classification Search
CPC ................................ H04M 9/082; H04M 1/60
See application file for complete search history.

(56) References Cited

U.S. PATENT DOCUMENTS

| 6,125,179 A * | 9/2000 | Wu ........................ | H04M 9/082 |
| | | | 379/406.01 |
| 9,380,150 B1 * | 6/2016 | Bullough ............... | H04M 3/002 |
| 2011/0019832 A1 * | 1/2011 | Itou ........................ | H04M 9/082 |
| | | | 381/66 |
| 2014/0064509 A1 * | 3/2014 | Su ........................... | G10L 21/02 |
| | | | 381/73.1 |
| 2015/0063599 A1 * | 3/2015 | Ring ..................... | H04R 1/1083 |
| | | | 381/107 |

(Continued)

FOREIGN PATENT DOCUMENTS

| CN | 111726730 A | * | 9/2020 | |
| GB | 2577839 A | * | 4/2020 | ............. H03G 3/001 |
| JP | H07039114 U | | 7/1995 | |

(Continued)

OTHER PUBLICATIONS

Extended European Search Report issued in European Appln. No. 20177963.4 dated Oct. 20, 2020.

(Continued)

*Primary Examiner* — Shreyans A Patel
(74) *Attorney, Agent, or Firm* — Rossi, Kimms & McDowell LLP (57) ABSTRACT

An acoustic processing method includes extracting a feature amount from a first audio signal representing sound collected by a microphone, receiving a second audio signal from a different device on a far-end side, determining a gain of the second audio signal based on the extracted feature amount, and adjusting the second audio signal based on the determined gain of the second audio signal.

12 Claims, 12 Drawing Sheets

(56) References Cited

U.S. PATENT DOCUMENTS

2020/0105287 A1* 4/2020 Chang .................. G06N 3/0454

FOREIGN PATENT DOCUMENTS

| | | | |
|---|---|---|---|
| JP | 2004020733 A | 1/2004 | |
| JP | 3731228 B2 * | 1/2006 | |
| JP | 2007060429 A | 3/2007 | |
| JP | 4282260 B2 * | 6/2009 | ............... H04B 3/23 |
| JP | 2009163105 A * | 7/2009 | ............... H03G 3/32 |
| KR | 1020100047740 A | 5/2010 | |

OTHER PUBLICATIONS

Office Action Issued in European Appln. No. 20177963.4 dated Mar. 30, 2022.

* cited by examiner

ACOUSTIC PROCESSING METHOD AND ACOUSTIC DEVICE

This Nonprovisional application claims priority under 35 U.S.C. § 119(a) on Patent Application No. 2019-106860 filed in Japan on Jun. 7, 2019, the entire contents of which are hereby incorporated by reference.

BACKGROUND

1. Technical Field

A preferred embodiment of the present invention relates to an acoustic device and an acoustic processing method.

2. Description of the Related Art

Japanese Unexamined Patent Application Publication No. 2004-20733 discloses a technique to adjust the level of sound outputted from a speaker, according to the volume of each talker.

Japanese Utility Model Application Publication No. H07-039114 discloses a technique to adjust the level of sound outputted from a speaker, according to a surrounding noise amount.

Both of Japanese Unexamined Patent Application Publication No. 2004-20733 and Japanese Unexamined Patent Application Publication No. H07-039114 relate to a technology to simply adjust the level of sound to be outputted from a speaker. Neither Japanese Unexamined Patent Application Publication No. 2004-20733 nor Japanese Utility Model Application Publication No. H07-039114 discloses a technology to adjust an audio signal received from a device on a far-end side.

SUMMARY

In view of the foregoing, an object of a preferred embodiment of the present invention is to provide an acoustic device and an acoustic processing method that adjust an audio signal received from a far-end side to an appropriate level.

An acoustic processing method includes extracting a feature amount from a first audio signal representing sound collected by a microphone, receiving a second audio signal from a different device on a far-end side, determining a gain of the second audio signal based on the extracted feature amount, and adjusting the second audio signal based on the determined gain of the second audio signal.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

An acoustic device according to a first preferred embodiment includes a microphone, a voice feature amount extractor that extracts a voice feature amount from sound (corresponding to a first audio signal of the present invention) collected by the microphone, an audio signal receiver that receives an audio signal (corresponding to a second audio signal of the present invention) from a different device on a far-end side, and a gain determiner that determines a gain of the audio signal received from the different device on the far-end side, based on the voice feature amount that has been extracted by the voice feature amount extractor.

The voice feature amount includes power level of an audio signal, for example. The acoustic device according to the first preferred embodiment determines a level of voice of a talker on a far-end side, according to voice of a talker on a near-end side. As an example, the talker on a near-end side talks loudly when a surrounding noise level is high. At this time, when the level of the voice of the talker on a far-end side is low, a user on a near-end side has difficulty hearing the voice of the talker on a far-end side. Therefore, as an example, the acoustic device, when the level of the voice of the talker on a near-end side is high, causes the level of the voice on a far-end side to be high. Accordingly, the acoustic device is able to output the voice received from the far-end side at an appropriate volume.

The acoustic device according to the first preferred embodiment includes a noise feature amount obtainer that obtains a noise feature amount from sound collected by a microphone. The gain determiner determines a gain, based on a voice feature amount and a noise feature amount.

The noise feature amount includes power level of a noise signal, for example. In such a case, the acoustic device determines the level of the voice of a far-end side, further according to the noise on a near-end side. For example, when the volume of noise is low, even if the level of the voice of the talker on a far-end side is reduced, the user on a near-end side has no difficulty hearing. Therefore, the acoustic device reduces the level of the voice of the talker on a far-end side, when the level of the voice of the talker on a near-end side is high and the level of noise is low.

It is to be noted that the acoustic device includes an echo canceler that removes an echo element from the sound collected by the microphone. The noise feature amount obtainer may obtain a noise feature amount from the sound of which the echo element has been removed by the echo canceller.

The acoustic device does not erroneously recognize the voice on a far-end side as noise by removing an echo element. Therefore, the acoustic device is able to obtain a noise feature amount with higher accuracy.

It is to be noted that the acoustic device may include a distinguisher that distinguishes a voice section, and the gain determiner may determine a gain in the voice section that the distinguisher has distinguished. The acoustic device, since performing in a limited (in a each of a distinguished) voice section, is able to determine a gain with higher accuracy.

Figure 1:
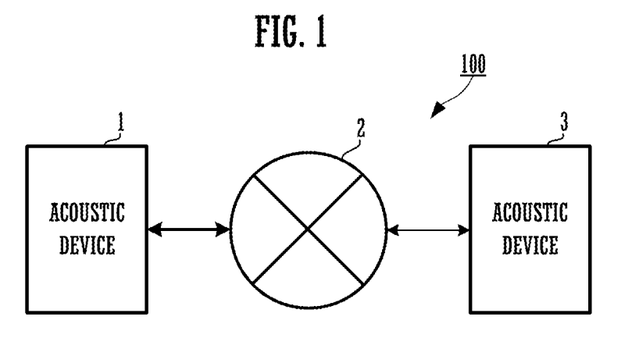
FIG. 1 is a block diagram showing a configuration of an acoustic system.

Hereinafter, the acoustic device according to the first preferred embodiment will be described in more detail. FIG. 1 is a diagram showing a configuration of an acoustic processing system 100. The acoustic processing system 100 includes a plurality (two in FIG. 1) of acoustic devices 1 and 3 that are connected to each other through a network 2.

The acoustic device 1 is set at a first point. The acoustic device 3 is set at a second point. In other words, the acoustic device 1 and the acoustic device 3 are set in places remote from each other.

The acoustic device 1 and the acoustic device 3 are connected to a remote place through the network 2, and are used for a system that performs interactive communication between remote places. For example, the acoustic device 1 and the acoustic device 3 are used for a conference system in a remote place. The acoustic device 1, for example, sends the voice of a user of the acoustic device 1 to a user of the acoustic device 3 through the network 2. In addition, the acoustic device 3, for example, sends the voice of the user of the acoustic device 3 to the user of the acoustic device 1 through the network 2.

In the following description, the user of the acoustic device 1 is referred to as a user on a near-end side. In addition, in the following description, the user of the acoustic device 3 is referred to as a user on a far-end side.

Figure 2:
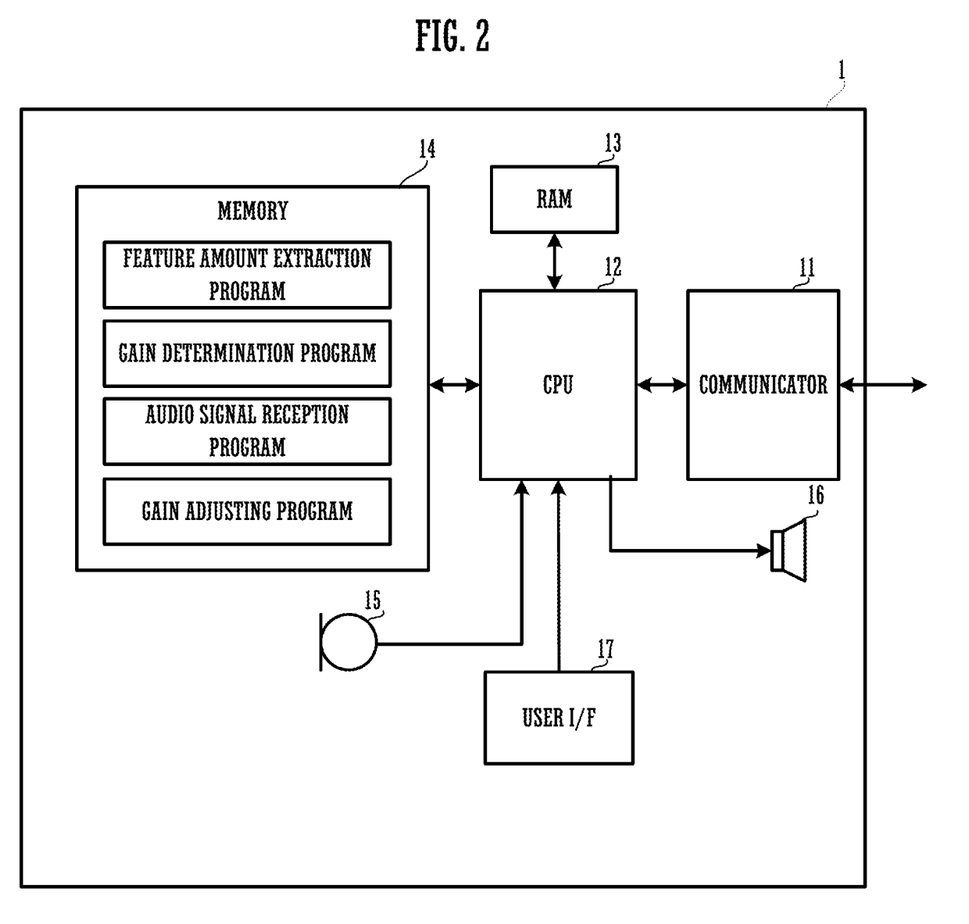
FIG. 2 is a block diagram showing a main configuration of an acoustic device 1.

FIG. 2 is a block diagram showing a main configuration of the acoustic device 1. It is to be noted that the acoustic device 3 has the same configurations and the same functions as the acoustic device 1, so that the description will be omitted.

The acoustic device 1 includes a communicator 11, a CPU 12, a RAM 13, a memory 14, a microphone 15, a speaker 16, and a user interface (I/F) 17. The communicator 11 configures the audio signal receiver of the present invention.

The CPU 12 reads a program from the memory 14 being a storage medium and temporarily stores the program in the RAM 13, and thus performs various operations.

The memory 14 includes a flash memory or a hard disk drive (HDD). The memory 14 stores programs for operating the CPU 12 as described above. In addition, the memory 14 stores a feature amount extraction program, a gain determination program, an audio signal reception program, and a gain adjusting program. The feature amount extraction program is a program to configure a voice feature amount extractor 51 to be described below. The gain determination program is a program to configure a gain determiner 52 to be described below. The audio signal reception program is a program to configure an audio signal receiver 53 to be described below. The gain adjusting program is a program to configure a gain adjustor 54 to be described below.

The microphone 15 obtains surrounding sound as an audio signal. The surrounding sound includes voice of a talker and noise. The microphone 15 digitally converts the obtained audio signal. The microphone 15 outputs the digitally converted audio signal to the CPU 12.

The CPU 12 performs signal processing on the audio signal inputted from the microphone 15. The CPU 12 outputs the audio signal on which the signal processing has been performed, to the communicator 11. It is to be noted that the acoustic device 1 may include a processor (DSP: Digital Signal Processor) exclusively used for the signal processing. In such a case, according to instructions of the CPU 12, the DSP performs signal processing.

The CPU 12 outputs the audio signal on which the signal processing has been performed, to the communicator 11. The communicator 11 is connected to the network 2. The communicator 11 sends the audio signal to the acoustic device 3 on a far-end side through the network 2.

In addition, the communicator 11 receives the audio signal from the acoustic device 3 through the network 2. The communicator 11 outputs the received audio signal to the CPU 12. The CPU 12 performs signal processing on the audio signal inputted from the communicator 11. The CPU 12 outputs the audio signal on which the signal processing has been performed, to the speaker 16.

The speaker 16 emits sound based on the audio signal inputted from the CPU 12. It is to be noted that the speaker 16, when receiving an input of a digital signal, emits sound based on the audio signal after performing D/A conversion.

The user I/F 17 receives an operation from a user. The operation by the user includes adjustment of the volume of a speaker, for example.

Figure 3:
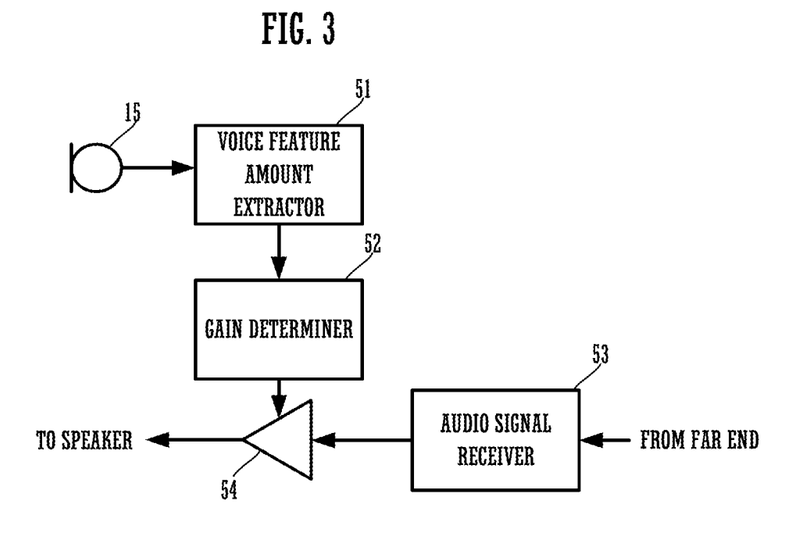
FIG. 3 is a block diagram showing a functional configuration of the acoustic device 1.

FIG. 3 is a block diagram showing a functional configuration of the acoustic device 1. The acoustic device 1, as a functional configuration, includes a microphone 15, a voice feature amount extractor 51, a gain determiner 52, an audio signal receiver 53, and a gain adjuster 54.

The voice feature amount extractor 51, the gain determiner 52, the gain adjuster 54, and the audio signal receiver 53 are implemented by programs of the CPU 12. The audio signal receiver 53 may be configured by the communicator 11.

The voice feature amount extractor 51 obtains power level of an inputted audio signal. The power level is calculated by the root mean square of an audio signal of a time axis, for example. The power level is an example of the voice feature amount. The extraction of the voice feature amount may be performed by limiting to a predetermined band (such as an FFT band, an octave band, the Mel band, or the Bark band). For example, the voice feature amount extractor 51 calculates power level of 1 kHz to 4 kHz. In this manner, the extraction of the voice feature amount may be extracted in a limited band which is a great number of human voice elements. In addition, the extraction of the voice feature amount may be extracted in a plurality of bands.

It is to be noted that the power level of an audio signal is preferably averaged on the time axis. The voice feature amount extractor 51, by averaging the power level of an audio signal on the time axis, does not erroneously recognize noise as voice even when high noise sound is suddenly inputted.

Figure 4:
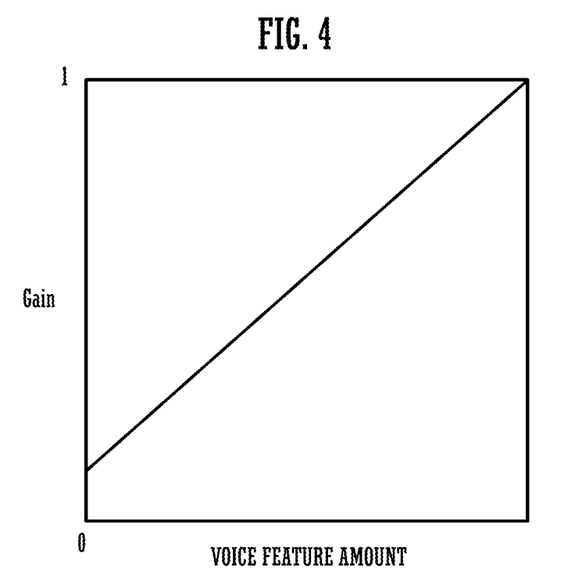
FIG. 4 is a diagram showing the relationship between a voice feature amount and a gain.

The gain determiner 52 determines a gain based on the voice feature amount extracted by the voice feature amount extractor 51. FIG. 4 is a diagram showing the relationship between the voice feature amount and the gain. As shown in FIG. 4, the gain determiner 52 sets the gain higher as the power level of an audio signal is higher. The gain determiner 52 sets the gain lower as the power level of an audio signal is lower.

The gain determiner 52 sets the determined gain to the gain adjuster 54. The audio signal receiver 53 receives an audio signal from a device on a far-end side. The gain adjuster 54 receives an input of an audio signal from the audio signal receiver 53, amplifies the audio signal by the set gain, and outputs the amplified audio signal to the speaker 16. In this manner, the gain determiner 52 determines the gain of the audio signal received from a different device on a far-end side, based on the voice feature amount extracted by the voice feature amount extractor 51.

Therefore, the acoustic device 1, when the level of voice of a talker on a near-end side is high, causes the level of voice on a far-end side to be high as well. The acoustic device 1, when the level of the voice of the talker on a near-end side is low, causes the level of the voice on a far-end side to be low as well. A talker talks quietly in many cases when the surrounding environment is quiet. According to the present preferred embodiment, when a talker talks quietly, sound to be outputted from the speaker 16 is also reduced. Accordingly, only the sound to be outputted from the speaker 16 is not increased. In other words, the talker does not have to manually adjust volume with caring about the surrounding environment.

It is to be noted that the gain determiner 52 may average the determined gain on a time axis. The gain determiner 52 suppresses a rapid change in volume by averaging a gain on a time axis, and reduces the sense of incongruity that a user feels.

In addition, the acoustic device 1 may detect a voice section, and may adjust a gain only in the detected voice section. For example, the acoustic device 1 does not need to change a gain during a far-end single talk. In such a case, the acoustic device 1 distinguishes a far-end single talk in a case in which the audio signal receiver 53 receives an audio signal having a level greater than or equal to a predetermined threshold value and the power level of an audio signal inputted from the microphone 15 is less than a predetermined value.

Figure 5:
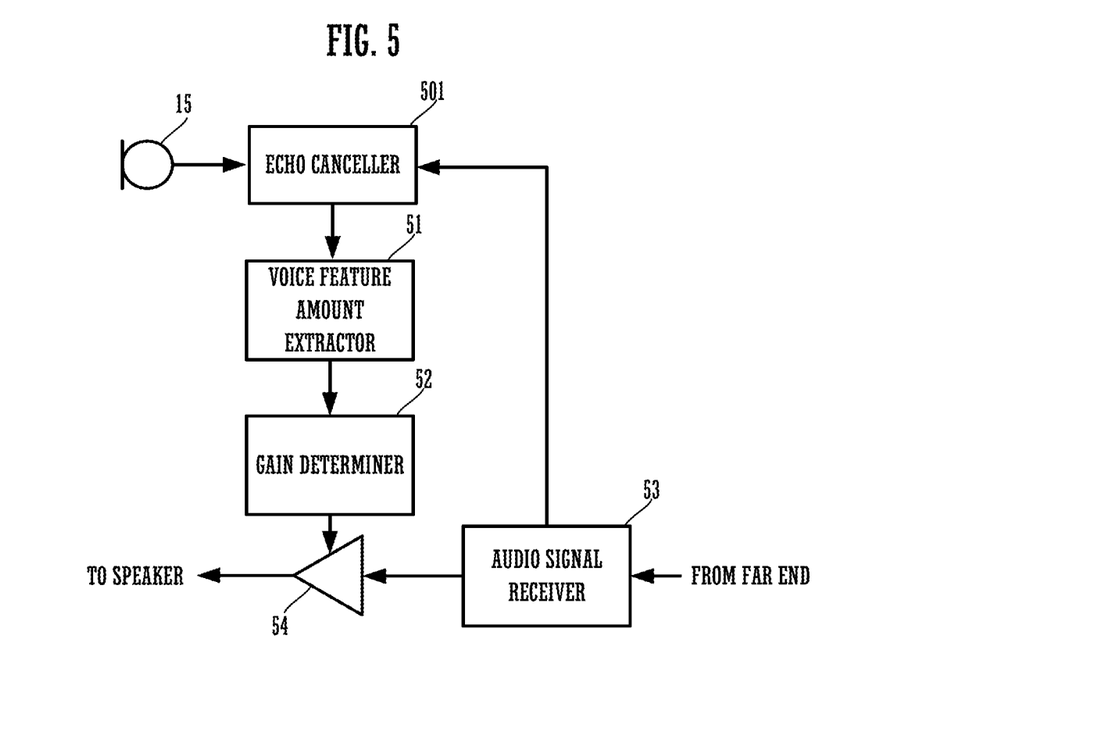
FIG. 5 is a block diagram showing a functional configuration of the acoustic device 1 including an echo canceler.

In addition, the acoustic device 1, as shown in FIG. 5, may remove an echo element by the echo canceller 501. The echo canceller 501 generates a pseudo echo element by filtering the audio signal received from the far-end side by transfer characteristics in the environment in which the acoustic device 1 is set. The echo canceller 501, by subtracting the pseudo echo element from the audio signal obtained by the microphone 15, removes the echo element. The voice feature amount extractor 51 extracts a voice feature amount using the audio signal of which the echo element has been removed by the echo canceller 501. In such a case, the voice feature amount extractor 51 may adjust a gain during the far-end single talk. It is to be noted that the echo canceller 501 may be hardware or may be achieved when the CPU 12 reads an echo cancellation program from the memory 14 and executes the program.

Figure 6:
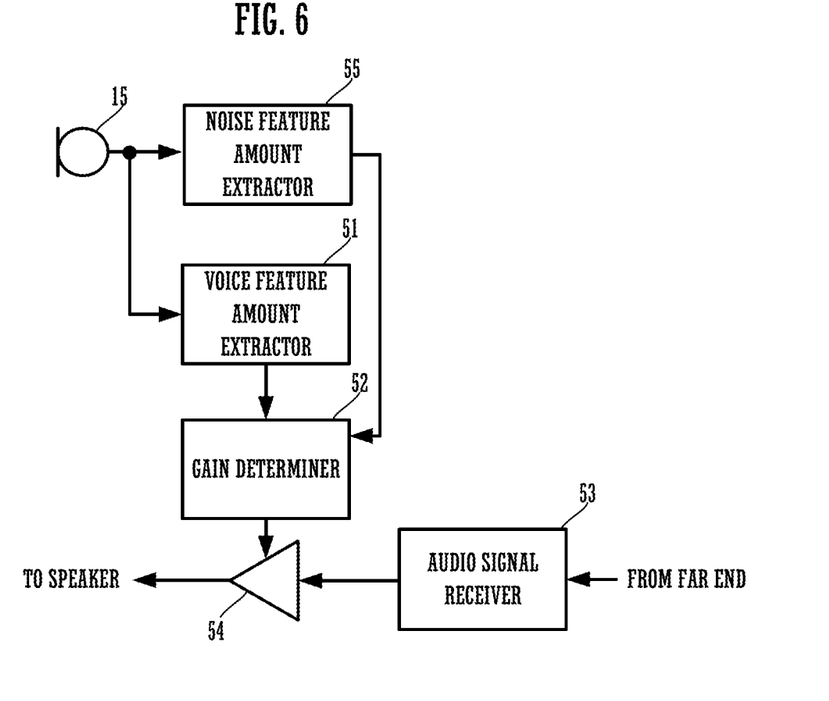
FIG. 6 a block diagram showing a functional configuration of an acoustic device 1 according to a modification.

Next, FIG. 6 is a block diagram showing a functional configuration of an acoustic device 1 according to a modification. The same reference numerals are given to components common to the components in FIG. 3, and the description will be omitted. The acoustic device 1 further includes a noise feature amount extractor 55. The noise feature amount extractor 55 is also achieved by the program of the CPU 12.

The noise feature amount extractor 55 extracts a noise feature amount from an inputted audio signal. The noise feature amount extractor 55 obtains a noise level as an example of the noise feature amount. More specifically, the noise feature amount extractor 55 obtains power level of an audio signal according to noise.

The noise feature amount extractor 55, in a case of determining that noise is inputted, obtains a noise level by obtaining the power level of an audio signal. The noise feature amount extractor 55 determines whether or not noise is inputted, for example, by distinguishing a near-end single talk, a far-end single talk, and a double talk. The noise feature amount extractor 55 distinguishes a far-end single talk in a case in which the audio signal receiver 53 receives an audio signal having a level greater than or equal to a predetermined threshold value and the power level of an audio signal inputted from the microphone 15 is less than or equal to a predetermined value. The noise feature amount extractor 55 distinguishes a double talk in a case in which the audio signal receiver 53 receives an audio signal having a level greater than or equal to a predetermined threshold value and the power level of an audio signal inputted from the microphone 15 is greater than or equal to a predetermined value. The noise feature amount extractor 55 distinguishes a near-end single talk in a case in which the audio signal receiver 53 receives an audio signal having a level less than a predetermined threshold value and the power level of an audio signal inputted from the microphone 15 is greater than or equal to a predetermined value.

The noise feature amount extractor 55 calculates a noise feature amount in a case of no correspondence to a near-end single talk, a far-end single talk, and a double talk. More specifically, the noise feature amount extractor 55 obtains the power level of the inputted audio signal as a noise feature amount in a case in which the audio signal receiver 53 receives an audio signal having a level less than a predetermined threshold value and the power level of an audio signal inputted from the microphone 15 is less than or equal to a predetermined value. However, the noise feature amount extractor 55, in a case of removing an echo element by the echo canceller 501, may set the power level of an audio signal inputted during a far-end single talk as a noise feature amount. It is to be noted that the noise feature amount may be averaged on a time axis.

It is to be noted that the voice feature amount extractor 51 may perform noise cancellation processing based on the noise feature amount extracted by the noise feature amount extractor 55. For example, the voice feature amount extractor 51 subtracts the power level of an audio signal that the noise feature amount extractor 55 has obtained, from the voice feature amount. As a result, the voice feature amount extractor 51 is able to obtain the power level of an audio signal according to voice with higher accuracy, based on the audio signal of which the noise sound has been removed.

Figure 7:
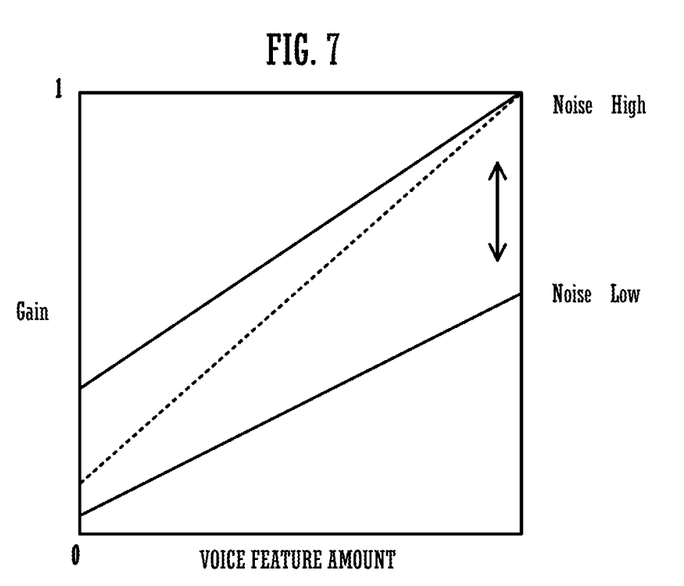
FIG. 7 is a diagram showing the relationship between a voice feature amount and a gain.

The gain determiner 52 determines a gain, based on the voice feature amount and the noise feature amount that have been extracted by the voice feature amount extractor 51 and the noise feature amount extractor 55. FIG. 7 is a diagram showing the relationship between the voice feature amount and the gain. As shown in FIG. 7, the gain determiner 52 sets the gain higher as the voice feature amount is higher. The gain determiner 52 sets the gain lower as the voice feature amount is lower. Furthermore, the gain determiner 52 sets the gain higher as the noise feature amount is higher. The gain determiner 52 sets the gain lower as the noise feature amount is lower.

Therefore, the acoustic device 1 according to a modification, when the level of voice of a talker on a near-end side is high and the noise level is low, causes the level of voice on a far-end side to be low. The acoustic device 1, when the level of the voice of the talker on a near-end side is low and the noise level is high, causes the level of the voice on a far-end side to be high. According to the modification, even when the voice of a talker is loud, sound to be outputted from the speaker 16 is reduced when the surrounding environment is quiet. Accordingly, only the sound to be outputted from the speaker 16 is not increased. In other words, the talker does not have to manually adjust the volume with caring about the surrounding environment. In addition, according to the modification, even when the voice of a talker is quiet, sound to be outputted from the speaker 16 is increased when the surrounding environment is noisy. Accordingly, only the sound to be outputted from the speaker 16 is not reduced. In other words, a talker, even when talking in a quiet voice in a noisy environment, can hear voice on the far-end side.

It is to be noted that the noise feature amount extractor 55 may further detect distant noise. Accordingly, the acoustic device 1, even when a talker other than a user is in a position away from the acoustic device 1, reduces a possibility of erroneously recognizing the voice of a talker on a near-end side.

Figure 8:
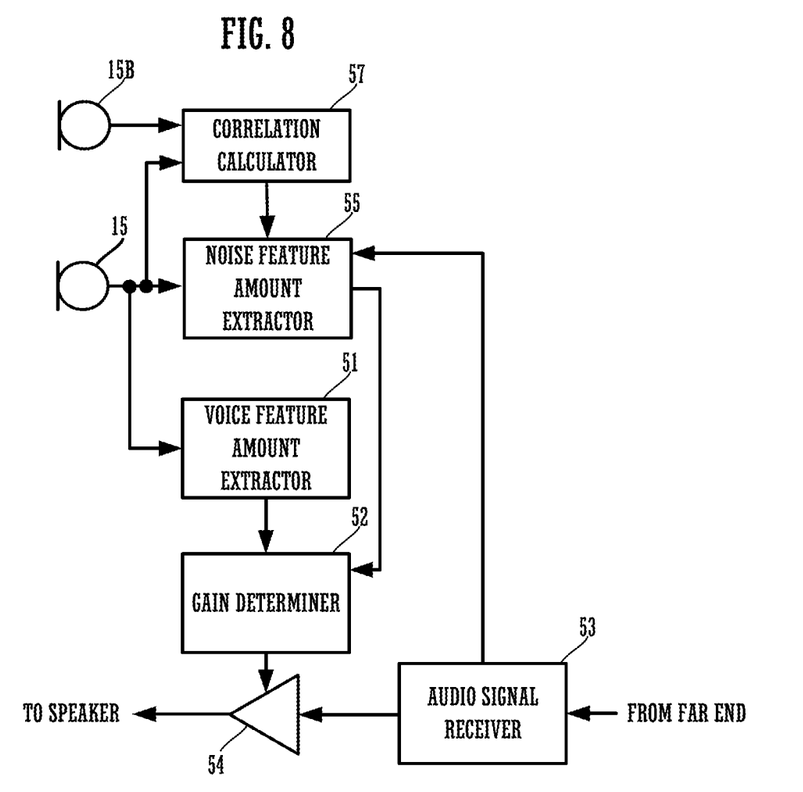
FIG. 8 is a diagram showing a functional configuration of the acoustic device 1 in a case of detecting distant noise.

FIG. 8 is a diagram showing a functional configuration of the acoustic device 1 in a case of detecting distant noise. The acoustic device 1 further includes a second microphone 15B and a correlation calculator 57 in addition to the configuration of FIG. 7.

The correlation calculator 57 receives an input of an audio signal from the microphone 15 and the microphone 15B. The correlation calculator 57 calculates a correlation of two audio signals. The correlation is calculated, for example, by cross-power level spectrum phase analysis.

Distant sound includes a large number of indirect sound elements, and is a sound of which an arrival direction is not fixed. For example, in a case in which the microphone 15 has a directivity and the microphone 15B has a non-directivity, sound collection capability with respect to distant sound is greatly different. Therefore, the correlation is reduced in a case of sound from a distant sound source, and is increased in a case of sound from a sound source near the device.

The noise feature amount extractor 55, when the correlation calculated by the correlation calculator 57 is small, distinguishes that sound from the distant sound source has been detected, and sets the power level of the inputted audio signal as a noise feature amount. The voice feature amount extractor 51, in a case in which the correlation calculated by the correlation calculator 57 is large, distinguishes that voice of a talker has been detected, and sets the power level of the inputted audio signal as a voice feature amount. Accordingly, the acoustic device 1 is able to obtain the noise feature amount and the voice feature amount with higher accuracy.

Figure 9:
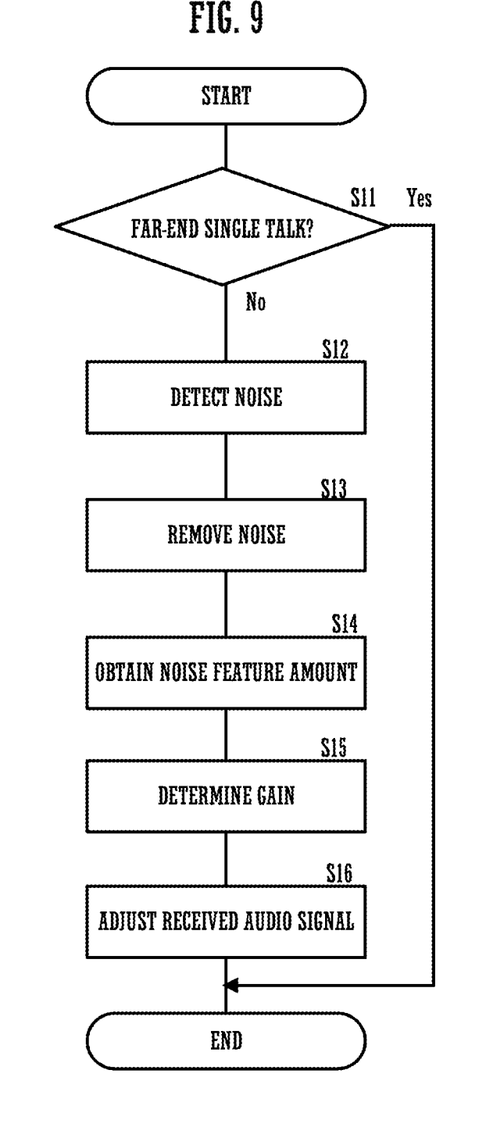
FIG. 9 is a flow chart showing an operation of an acoustic device 1 according to a first modification.

FIG. 9 is a flow chart showing an operation of an acoustic device 1 according to a first modification. The acoustic device 1 first distinguishes a near-end single talk, a far-end single talk, and a double talk. In other words, the acoustic device 1 distinguishes whether or not a far-end single talk is performed (S11).

The acoustic device 1, in a case of distinguishing a far-end single talk (S11: Yes), ends the processing. In other words, the acoustic device 1 does not change a gain.

The acoustic device 1, in a case that a far-end single talk is not performed (in a case of a near-end single talk or a double talk) (S11: No), detects background noise from the inputted audio signal (S12).

The acoustic device 1 obtains power level of an audio signal according to the detected background noise, and reduces a noise element from the audio signal (S13). Subsequently, the acoustic device 1 obtains the power level of the inputted audio signal as a noise feature amount (S14). Finally, the acoustic device 1 determines a gain of the audio signal received from the far-end side, based on a voice feature amount and the noise feature amount (S15) and adjusts a level of the received audio signal by the gain (S16).

The processing of S11, S12, and S14 is not required in the present invention. The acoustic device 1, in S13, may determine a gain, based on the voice feature amount extracted by the voice feature amount extractor 51, without using the noise feature amount.

It is to be noted that the acoustic device according to the first preferred embodiment may determine a gain, based on the noise feature amount extracted by the noise feature amount extractor 55, without using the voice feature amount. For example, the acoustic device 1 increases a gain when the power level of a noise signal is high. In other words, the acoustic device according to the first preferred embodiment may extract a feature amount from the sound collected by a microphone, and may determine a gain of an audio signal received from a different device on a far-end side, based on the extracted feature amount.

Second Preferred Embodiment

An acoustic device according to a second preferred embodiment includes microphone, a noise level obtainer that obtains a noise level from sound collected by the microphone, a storage in which a predetermined noise level is stored, an audio signal receiver that receives an audio signal from a different device on a far-end side, and a gain determiner that determines a gain of the audio signal received from the different device on the far-end side, based on the predetermined noise level and a present noise level obtained by the noise level obtainer.

The acoustic device according to the second preferred embodiment determines a level of the audio signal on the far-end side, based on a previously stored noise level and the present noise level. In the acoustic device according to the second preferred embodiment, the volume of a speaker with respect to the noise level as a reference is automatically determined, so that a user on a near-end side has no difficulty hearing. In addition, the acoustic device reduces the level of the voice on a far-end side, when the present noise level reduces with respect to the noise level as a reference. Accordingly, only the sound to be outputted from the speaker 16 is not increased. In other words, the talker does not have to manually adjust the volume with caring about the surrounding environment.

More preferably, the storage stores the noise level obtained by the noise level obtainer. The gain determiner determines a gain of the audio signal received from the different device on a far-end side, based on a previous noise level stored in the storage and the present noise level obtained by the noise level obtainer.

In such a case, the acoustic device obtains noise around the device and determines the volume of a speaker, based on the level of the obtained noise sound. Therefore, the acoustic device is able to adjust the volume of a speaker according to a more nearly actual environment.

In addition, the acoustic device may include a volume adjustment receiver that receives volume adjustment from a user. The storage may store a noise level when the user adjusts the volume.

In such a case, the acoustic device determines the volume of a speaker, on a basis of a ratio between the noise level and the volume of a speaker that the user manually adjusted. Accordingly, the volume of a speaker is automatically adjusted to a volume that the user feels appropriate.

It is to be noted that the acoustic device may include a distinguisher that distinguishes a voice section, and the gain determiner may determine a gain in the voice section that the distinguisher has distinguished. The acoustic device, since performing in a limited (in a each of distinguished) voice section, is able to determine a gain with higher accuracy.

Figure 10:
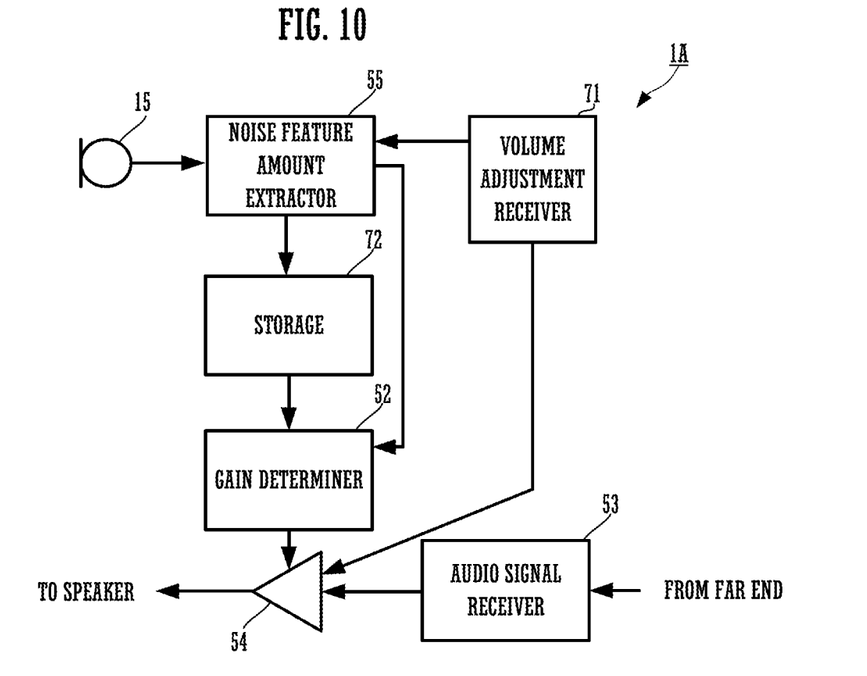
FIG. 10 is a block diagram showing a functional configuration of an acoustic device 1A.

Hereinafter, an acoustic device 1A according to the second preferred embodiment will be described in more detail. FIG. 10 is a block diagram showing a functional configuration of the acoustic device 1A. The same reference numerals are given to components common to the components of the acoustic device 1 according to the first preferred embodiment in FIG. 6, and the description will be omitted.

The acoustic device 1A further includes a volume adjustment receiver 71, and a storage 72 that stores a noise feature amount that the noise feature amount extractor 55 has extracted. The hardware configuration of the acoustic device 1A is the same as the hardware configuration shown in FIG. 2. The storage 72 is configured by the memory 14. The volume adjustment receiver 71 is configured by the user I/F 17. The volume adjustment receiver 71 may be implemented when the CPU 12 reads and executes a volume adjustment receive program stored in the memory 14.

The volume adjustment receiver 71 receives an operation of volume adjustment from a user. The volume adjustment receiver 71 adjusts the gain of the gain adjuster 54, based on the operation of the received volume adjustment.

The noise feature amount extractor 55 is an example of the noise level obtainer. The noise feature amount extractor 55 is configured by the feature amount extraction program. The noise feature amount extractor 55 obtains a noise feature amount. The way to obtain the noise feature amount is the same as the way of the first preferred embodiment, and, for example, obtains a noise level. The noise feature amount extractor 55 outputs a noise level to the storage 72 when the volume adjustment receiver 71 receives the operation of volume adjustment. The storage 72 stores the noise level when a user adjust the volume. The noise feature amount extractor 55 outputs the noise level to the gain determiner 52. The gain determiner 52 determines a gain, based on the previous noise level stored in the storage 72 and the present noise level outputted from the noise feature amount extractor 55. For example, the gain determiner 52, in a case in which the present noise level is higher than the previous noise level, increases the gain. Accordingly, the volume of a speaker with respect to the noise level as a reference is automatically determined.

Figure 11:
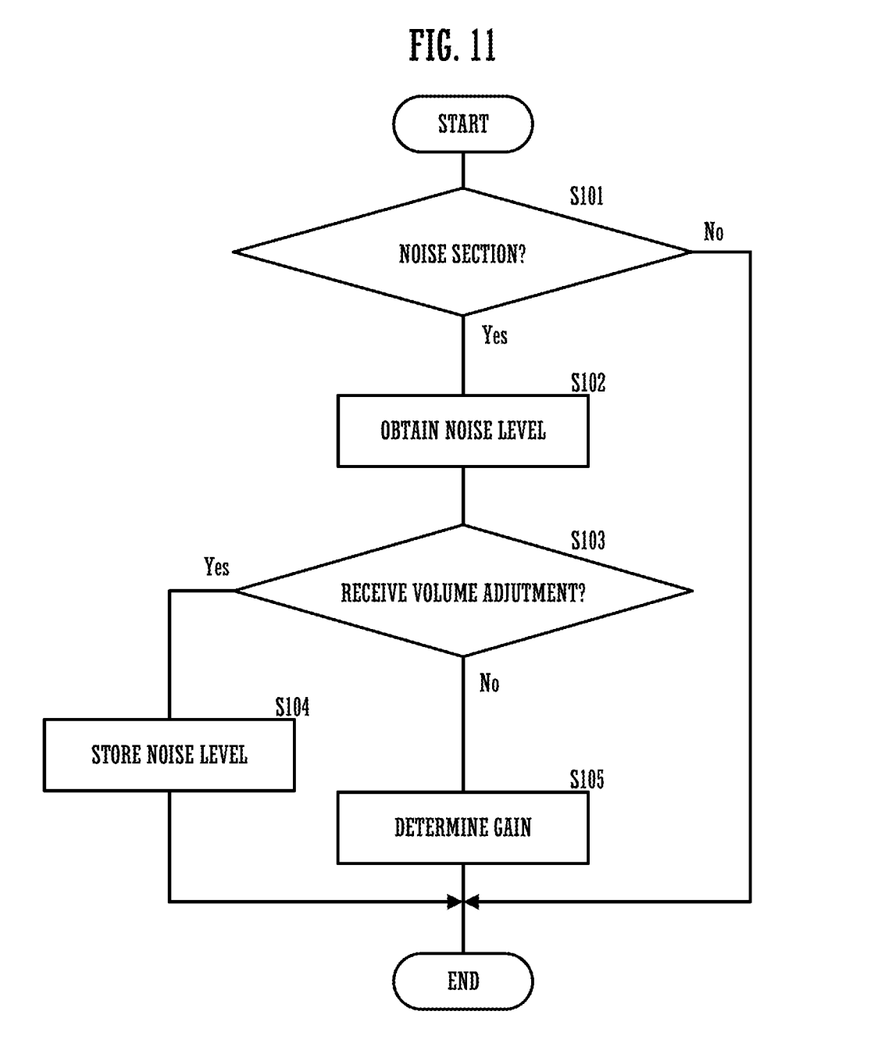
FIG. 11 is a flow chart showing an operation of the acoustic device 1A.

FIG. 11 is a flow chart showing an operation of the acoustic device 1A. The acoustic device 1A first distinguishes whether or not a noise section is present (S101). As shown in FIG. 11, the acoustic device 1A distinguishes the noise section in a case in which a status is not any of a near-end single talk, a far-end single talk, and a double talk. The acoustic device 1A, in a case of distinguishing a near-end single talk, a far-end single talk, or a double talk (S101: No), ends the processing. In other words, the acoustic device 1A does not perform a gain adjustment when a noise section is not present.

It is to be noted that the acoustic device 1A, in a case of removing an echo element by the echo canceller 501, may distinguish a far-end single talk as a noise section.

The acoustic device 1A, in a case of distinguishing a noise section (S101: Yes), obtains a noise level, for example, as a noise feature amount (S102). Subsequently, the acoustic device 1A determines whether or not volume adjustment has been received from a user (S103). The acoustic device 1A, in a case of receiving the volume adjustment from a user (S103: Yes), stores the obtained noise level (S104). The acoustic device 1A, in a case of receiving no volume adjustment (S103: No), determines a gain, based on the stored previous noise level and the obtained present noise level (S105). For example, the acoustic device 1A, in the case in which the present noise level is higher than the previous noise level, increases the gain. Accordingly, the volume of a speaker with respect to the noise level as a reference is automatically determined.

It is to be noted that a gain adjustment may be performed to all the bands or may be performed in a limiting predetermined band (such as an FFT band, an octave band, the Mel band, or the Bark band). For example, the voice feature amount extractor 51 may perform a gain adjustment in a band of 1 kHz to 4 kHz that has a significant effect on the sensitivity of voice.

In addition, the acoustic device 1A may perform a gain adjustment, based on the obtained noise feature amount. For example, the acoustic device 1A performs a gain adjustment according to a noise spectrum. The acoustic device 1A sets a gain high in a band in which a noise level is high. Accordingly, surrounding people except a user are less likely to feel noisy about the sound outputted from the speaker 16.

In addition, the acoustic device 1A may perform a gain adjustment according to human auditory characteristics (loudness characteristics). For example, low-frequency and high-frequency gains do not greatly change regardless of a change in noise level.

The descriptions of the first preferred embodiment and the second preferred embodiment are illustrative in all respects and should not be construed to be restrictive. The scope of the present invention is defined not by the above described preferred embodiments but by the scope of claims for patent. Further, the scope of the present invention includes the scopes of the claims for patent and the scopes of equivalents.

For example, the voice feature amount is not limited to power level. For example, the acoustic device 1 may calculate the peak of a low frequency element of a cepstrum obtained by further applying the Fourier transform to the spectrum of an audio signal. The acoustic device 1 may normalize a peak value of the low frequency element of a cepstrum, may convert the value into a value of 0 to 1, and may extract the value as a voice feature amount. Similarly, the noise feature amount is not limited to power level.

In addition, the storage does not need to be built in the acoustic device 1A. For example, the storage may be provided in a server. In such a case, the acoustic device 1A obtains a noise level from the storage of the server.

Figure 12:
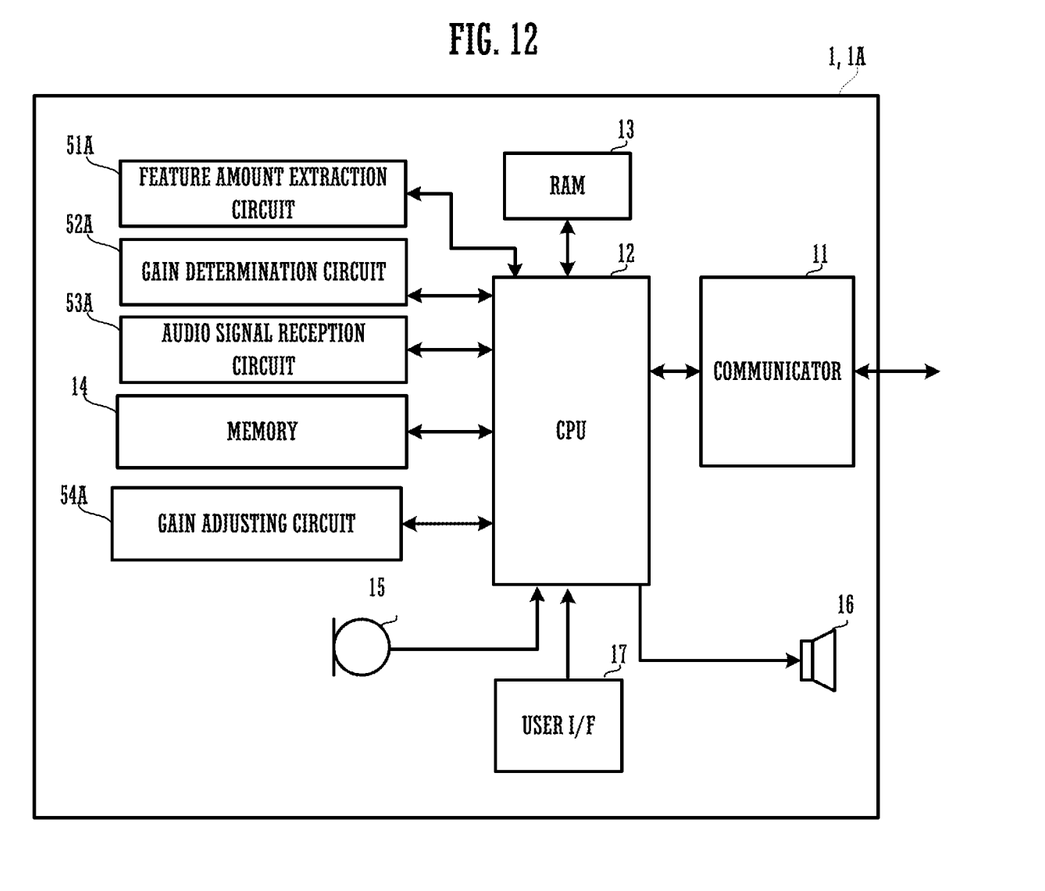
FIG. 12 is a block diagram showing a main configuration of the acoustic device 1, 1A.

It is to be noted that all the configurations of the present invention may be implemented by hardware such as FPGA. For example, as shown in FIG. 12, the acoustic device 1 or the acoustic device 1A may include a feature amount extraction circuit 51A corresponding to the voice feature amount extractor 51 or the noise feature amount extractor 55, a gain determination circuit 52A corresponding to the gain determiner 52, an audio signal reception circuit 53A corresponding to the audio signal receiver 53, and a gain adjusting circuit 54A corresponding to the gain adjustor 54. As a matter of course, the configuration of the present invention may be implemented by appropriately combining hardware and software.

Finally, the descriptions of the above described preferred embodiments are illustrative in all respects and should not be construed to be restrictive. The scope of the present invention is defined not by the above described preferred embodiments but by the scope of claims for patent. Further, the scope of the present invention includes the scopes of the claims for patent and the scopes of equivalents.

What is claimed is:

1. An acoustic processing method comprising:
extracting a voice feature amount from a first audio signal representing sound collected by a microphone;
receiving a second audio signal from a device at a far-end side;
calculating a noise feature amount based on a power level of the first audio signal, in a state where:
the power level of the first audio signal is less than or equal to a first predetermined value; and
a power level of the second audio signal is less than a second predetermined value,
determining a gain of the second audio signal based on the extracted voice feature amount and the calculated noise feature amount; and
adjusting the second audio signal based on the determined gain of the second audio signal.

2. The acoustic processing method according to claim 1, further comprising:
removing an echo element from the first audio signal using an echo canceller,
wherein the extracting extracts the voice feature amount from the first audio signal after the removing has removed the echo element from the first audio signal.

3. The acoustic processing method according to claim 1, further comprising:
removing an echo element from the first audio signal using an echo canceller,
wherein the calculating calculates the noise feature amount from the first audio signal after the removing has removed the echo element from the first audio signal.

4. The acoustic processing method according to claim 1, wherein the voice feature amount includes the power level of the first audio signal.

5. The acoustic processing method according to claim 1, wherein the determining distinguishes a voice section from the first audio signal and determines the gain of the second audio signal from the distinguished voice section.

6. The acoustic processing method according to claim 1, further comprising outputting the adjusted second audio signal to a speaker.

7. An acoustic processing method comprising:
obtaining a noise level from a first audio signal representing sound collected by a microphone;
receiving a volume adjustment from a user;
storing the obtained noise level as a previous noise level, in a state where a noise section has been distinguished and the receiving has received the volume adjustment from the user;
receiving a second audio signal from a device at a far-end side;
determining a gain of the second audio signal based on the stored previous noise level and the obtained noise level that is currently obtained, in a state where the volume adjustment from the user is not received; and
adjusting the second audio signal based on the determined gain of the second audio signal,
wherein the noise section is distinguished in a case where:
a power level of the first audio signal is less than or equal to a first predetermined value; and
a power level of the second audio signal is less than a second predetermined value.

8. The acoustic processing method according to claim 7, further comprising:
removing an echo element from the first audio signal,
wherein the obtaining obtains the noise level from the first audio signal after the removing has removed the echo element from the first audio signal.

9. An acoustic device comprising:
a microphone;
at least one memory storing instructions;
a processor that implements the instructions and executes a plurality of tasks including:
a noise level obtaining task that obtains a noise level from a first audio signal representing sound collected by the microphone;
a volume adjusting task that receives a volume adjustment from a user;
a storing task that stores the obtained noise level as a previous noise level in the at least one memory, in a state where a noise section has been distinguished and the volume adjustment task receives the volume adjustment from the user;
an audio signal receiving task that receives a second audio signal from a different device at a far-end side;
a gain determining task that determines a gain of the second audio signal based on the stored previous noise level and the obtained noise level that is currently obtained, in a state where the volume adjustment task has not received the volume adjustment from the user; and
a level adjusting task that adjusts the second audio signal based on the determined gain of the second audio signal,
wherein the noise section is distinguished in a case where:
a power level of the first audio signal is less than or equal to a first predetermined value; and
a power level of the second audio signal is less than a second predetermined value.

10. The acoustic device according to claim 9, wherein:
the plurality of tasks include an echo cancelling task that removes an echo element from the first audio signal, and
the noise level obtaining task obtains the noise level from the first audio signal after the echo cancelling task has removed the echo element from the first audio signal.

11. The acoustic device according to claim 9, wherein the gain determining task detects a voice section from the first audio signal and determines the gain of the second audio signal from the detected voice section.

12. The acoustic device according to claim 9, wherein the gain adjusting task outputs the adjusted second audio signal to a speaker.

* * * * *